United States Patent
Arndt

(10) Patent No.: US 8,024,496 B2
(45) Date of Patent: Sep. 20, 2011

(54) ENHANCED MEMORY MIGRATION DESCRIPTOR FORMAT AND METHOD

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 12/421,754

(22) Filed: Apr. 10, 2009

(65) Prior Publication Data

US 2010/0262727 A1   Oct. 14, 2010

(51) Int. Cl.
G06F 3/00 (2006.01)
G06F 13/00 (2006.01)
(52) U.S. Cl. .......... 710/22; 710/8; 710/15; 710/33
(58) Field of Classification Search .......... None
See application file for complete search history.

(56) References Cited

U.S. PATENT DOCUMENTS

| | | |
|---|---|---|
| 5,909,540 A | 6/1999 | Carter et al. |
| 2005/0188278 A1 | 8/2005 | Zimmer et al. |
| 2005/0256979 A1* | 11/2005 | Lin .................. 710/22 |
| 2006/0288187 A1* | 12/2006 | Burugula et al. ....... 711/171 |
| 2007/0067435 A1 | 3/2007 | Landis et al. |
| 2007/0260839 A1 | 11/2007 | Arndt |

OTHER PUBLICATIONS

IBM, Best Practices for Data Migration, Jun. 2007, IBM Global Services, online [accessed on Nov. 30, 2010, URL: http://www-935.ibm.com/services/us/gts/pdf/softek-best-practices-data-migration.pdf].*

* cited by examiner

*Primary Examiner* — Tariq Hafiz
*Assistant Examiner* — Scott Sun
(74) *Attorney, Agent, or Firm* — Yee & Associates, P.C.; Matthew W. Baca

(57) ABSTRACT

An enhanced migration descriptor migrates a plurality of source sub-pages in a large source page accessible by direct memory access devices. A splitter and selector are integrated into a configuration of a computer. Responsive to a request to migrate a large page containing the plurality of source sub-pages in the source page, the splitter divides a plurality of high order page numbers from a plurality of low order page numbers. The selector selects the high order page number of the large page and creates an enhanced migration descriptor comprising the high order page number and a size of the large page. The selector, by the enhanced migration descriptor, combines the low order page number for a sub-page with the destination address and size of the enhanced migration descriptor to migrate the large page and each of the plurality of sub-pages.

18 Claims, 8 Drawing Sheets

ENHANCED MEMORY MIGRATION DESCRIPTOR FORMAT AND METHOD

BACKGROUND

1. Field

The disclosure relates generally to the data processing field and more specifically to migrating a source page containing a plurality of contiguous sub-pages that are subject to access by input/output devices, by means of a splitter, a selector, and an enhanced migration descriptor.

2. Description of the Related Art

Reconfiguration of a computer system may be performed while the computer system is running. Doing so, however, frequently necessitates that data processing operations be disrupted. For example, if multiple operating systems are running on a computer, there may be a need to reallocate a block of memory being used by a first operating system so that it may be used by a second operating system. Traditionally, this situation has required that the first operating system stop using the block of physical memory before it is reallocated. As another example, when a problem is detected in a block of physical memory, it may be desirable to remove the memory from operation so it can be replaced. Again, the operating system that was using the block of memory must stop using it during the replacement process.

A computer system may often be reconfigured without disrupting data processing operations by using virtual memory management mechanisms that are available in current operating systems. These mechanisms, however, are not satisfactory when the block of memory to be moved is subject to access by input/output (I/O) devices, commonly referred to as direct memory access (DMA). In particular, blocks of memory that are subject to access by I/O devices are conventionally "pinned," that is, exempted from being moved, because access to them is maintained by essentially endless I/O programs that run as long as the operating system runs; and it would be disruptive to the system to stop such an I/O program.

It is possible to invalidate an I/O address translation entry for a block of memory (also referred to as a "page") that is to be migrated. Then, if an I/O device were to attempt to access the page, the invalid translation entry would cause an I/O page fault to be reported and the I/O device driver would have to respond. That is, the driver would restart the I/O operation after the page again becomes available. In order for this procedure to work, however, the device drivers of all I/O devices that could possibly have access to the page would have to implement I/O page fault recovery code, which is not a practical solution.

Prior mechanisms for migrating data subject to access by I/O devices have the problems discussed above. One solution involves a mechanism for migrating data in which DMA operations for I/O adapters that access the data being migrated are disabled for a short period of time. While this mechanism is effective in many applications, the industry standard PCI-E bus does not contain a mechanism for temporarily disabling DMA operations without adversely affecting other transfers to/from an I/O adapter.

Another solution, that allows migration of data without temporarily disabling DMA operations, is to use multiple migration descriptors. Methods to implement multiple descriptor functionality were originally disclosed in U.S. patent application Ser. No. 11/380,052. As will be explained further below, the method of U.S. patent application Ser. No. 11/380,052 requires the creation of a migration descriptor for each I/O mapped logical page that covers a real address range to be migrated.

Thus, when a block of data covers multiple real address ranges, a migration descriptor is required for each I/O mapped logical page covering a real address range to be migrated. In other words, a large page can have a number of sub-pages, each of the sub-pages having a different real address range. Presently, each of these source sub-pages requires its own migration descriptor in order to be migrated to a corresponding destination sub-page in a destination page. The allocation and management of multiple migration descriptors, where a migration descriptor is required for each I/O mapped logical page, introduces a significant overhead into the memory migration process. Therefore, a need exists for a way to migrate data without the memory load caused by multiple migration descriptors.

SUMMARY

According to one embodiment of the present invention, the different illustrative embodiments provide a computer implemented method, a data processing system, and a computer usable program code for migrating data accessible by direct memory access devices. The illustrative embodiments use a splitter and a selector so that only one enhanced migration descriptor is required to migrate a plurality of contiguous source sub-pages in a large source page. The illustrative embodiments receive a request to migrate a source page containing a plurality of contiguous sub-pages and, responsive to the request, migrate the plurality of contiguous sub-pages from the source page to the destination page by means of a single migration descriptor referred to as an "enhanced migration descriptor." The illustrative embodiments ensure read data for the direct memory access are fetched from the source page by means of either the translation control entry table or the enhanced migration descriptor. The illustrative embodiments also ensure that write data for the direct memory access are stored in both the source page and the destination page by means of the enhanced migration descriptor.

The illustrative embodiments integrate a splitter and a selector into a configuration of a computer. Responsive to a request to migrate a large source page containing the plurality of contiguous source sub-pages to a destination page, the splitter divides a plurality of transmission control entry page numbers into a plurality of high order page numbers and a plurality of low order page numbers. The selector identifies the high order page number of the large page under the control of an enhanced migration descriptor comprising the high order page number of the large destination page and the size of the large page. The large page size field of the enhanced migration descriptor in conjunction with the appropriate bits selected from the TCE table by the selector, specifies the offset of each of the contiguous sub-pages. The large page is migrated from the source page to a destination page by means of the enhanced migration descriptor, and the selector.

During migration of the data from the large source page to the destination page, read data for any direct memory access from the large source page is accomplished either directly to the large source page by means of the source location from the translation control entry table, or from the destination page by means of the enhanced migration descriptor. During migration of the data from the source page to the destination page, storing write data for any direct memory access in both the source page and the destination page is accomplished by means of the enhanced migration descriptor and the selector to identify the destination address, the size of the large page, and the appropriate offset for the source sub-page. Since the offset will be the same for both addresses, the new data in the sub-page can be written to the destination page in the correct location in the destination.

BRIEF DESCRIPTION OF THE SEVERAL
VIEWS OF THE DRAWINGS

The novel features believed characteristic of the embodiments are set forth in the appended claims. The embodiments, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED
EMBODIMENT

Figure 1:
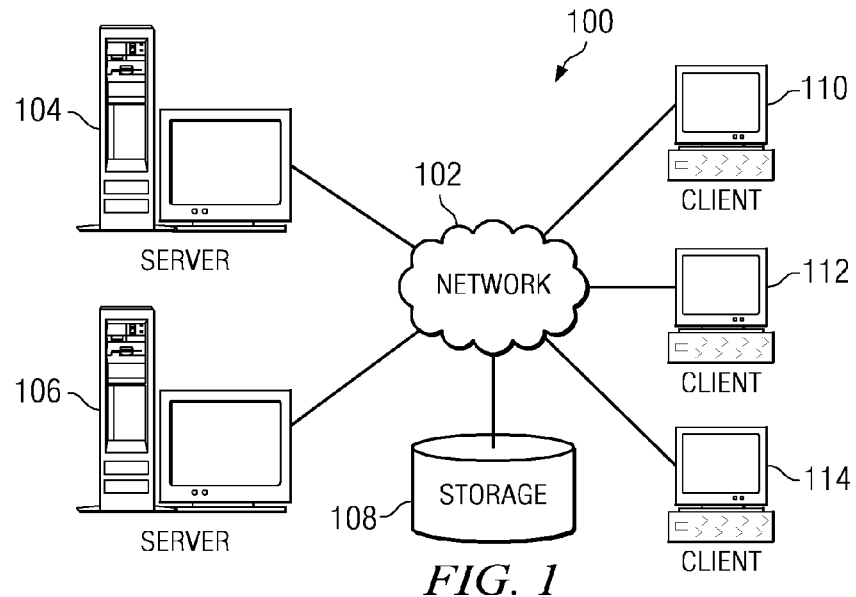
FIG. 1 is a pictorial representation of a network of data processing systems in which illustrative embodiments may be implemented.
Figure 2:
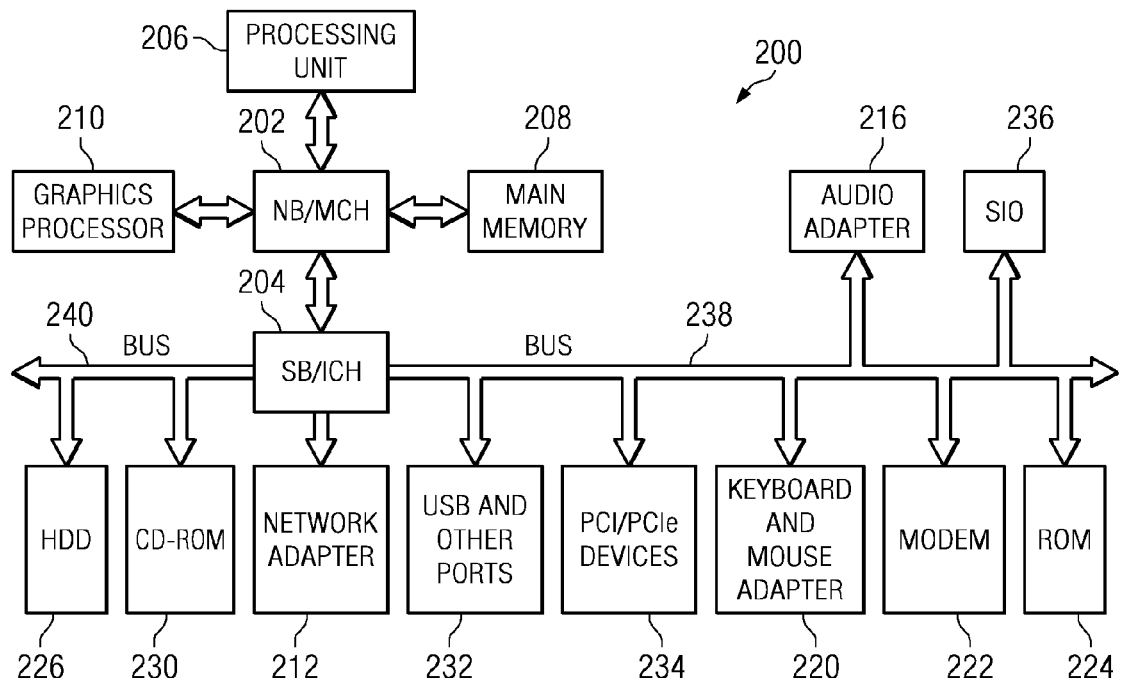
FIG. 2 is a block diagram of a data processing system in which illustrative embodiments may be implemented.

The illustrative embodiments provide for migrating data that is subject to access by input/output devices. With reference now to the figures and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 is a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provide calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 by means of computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented by means of any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit 206 may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
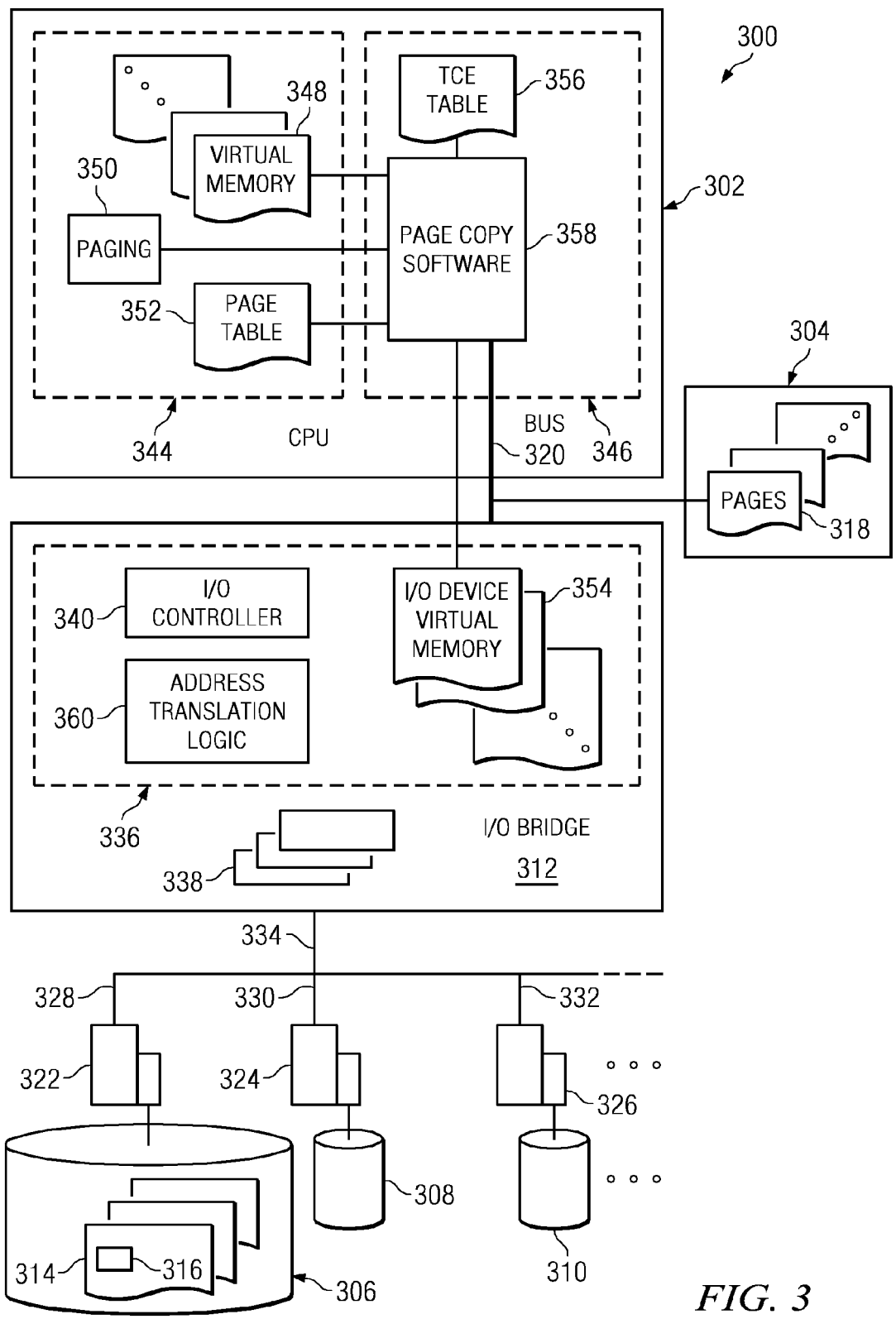
FIG. 3 is a block diagram that illustrates relevant details of a data processing system in accordance with an illustrative embodiment.

FIG. 3 depicts a block diagram that illustrates relevant details of a data processing system in accordance with an illustrative embodiment. The system is generally designated by reference number 300, and may be implemented in data processing system 200 in FIG. 2. Data processing system 300 generally includes processing unit 302, volatile memory 304, a plurality of I/O devices 306, 308, and 310, and I/O bridge 312. In the exemplary embodiment illustrated in FIG. 3, data processing system 300 employs a PCIe architecture, and I/O bridge 312 comprising a PCI Host Bridge (PHB).

As used herein, the term "I/O device" may include any of a variety of devices which interface to a computer system and provide information to the system and/or receive information from the system. Examples of I/O devices include a memory, mouse, keyboard, display, printer, optical scanner, etc. In the exemplary embodiment illustrated in FIG. 3, I/O device 306 comprises a non-volatile memory such as disk storage storing blocks 314 of data 316.

Blocks 314 of data 316 may be written from I/O device 306 to volatile memory 304. Blocks 314 are referred to as "physical pages" 318, with concern to their actual physical location in volatile memory 304. Volatile memory 304 is sometimes also referred to as "physical memory."

Physical pages 318 in volatile memory 304 are accessible by I/O devices 306, 308, and 310 and by processing unit ("CPU") 302 of data processing system 300. More specifically, physical pages 318 are coupled by bus 320 to I/O bridge 312 and I/O devices 306, 308, and 310 are coupled to I/O bridge 312 by I/O adapters 322, 324, and 326, respectively, and segments 328, 330, and 332 of I/O bus 334.

I/O bridge 312 includes I/O bridge logic 336, that arbitrates among the I/O devices, that is, that grants the I/O devices access one-at-a-time to I/O bus 334, and from I/O bus 334 to bus 320. I/O bridge 312 also includes I/O data buffers 338, for caching data 316 from physical pages 318 or from an I/O device, such as I/O device 306, responsive to requests by the I/O devices. I/O bridge logic 336 includes logic for handling the data buffering. In the illustrated embodiment, I/O bridge logic 336 also includes I/O controller 340, also called an I/O processor.

Data processing system 302 executes operating system and firmware instructions, images which are represented in FIG. 3 in the data processing system as operating system 344 and firmware 346. Instructions for execution by data processing system 302 include instructions from firmware 346, instructions from operating system 344 that run with the support of firmware 346, and application instructions (not shown) that run with the support of firmware 346 and operating system 344. It should be appreciated that firmware 346 runs on data processing system 302 substantially independently of operating system 344, and provides a lower level of interface and, therefore, greater access to hardware components such as data processing system 302 than does operating system 344.

In certain respects, operating system 344 presents applications running on data processing system 302 a view of blocks 314 of data 316 as pages of virtual memory 348, so that the actual location of data 316 is fairly transparent, regardless of whether the data is in volatile memory 304 or on I/O device 306, for example. Accordingly, operating system 344 includes paging mechanism 350 and page table 352 for somewhat transparently moving data 316 in and out of volatile memory 304.

Concerning I/O device virtual memory 354, operating system 344 directs I/O bridge logic 336 to map blocks 314 of data 316 to physical pages 318 via entries in a translation control entry ("TCE") table 356. In the illustrative embodiment, firmware 346 provides services that are put to use for moving data from one of physical pages 318 to another of physical pages 318, so that the first page can be put to a different service or idled. To perform this function, operating system 344 finds a set of one or more entries for the first one of the physical pages 318 in TCE table 356. Then, operating system 344 directs firmware 346 component, such as page copy software 358, to copy the data from a first of physical pages 318 associated with a given page in I/O device virtual memory 354 to a second of physical pages 318, then change the associated mapping in TCE Table 356 such that future accesses to I/O device virtual memory 354 are directed to the second physical page. Page copy software 358 has a number of functions that will be described in detail hereinafter.

To understand TCE table 356, consider that I/O devices 306, 308, and 310 each have their own view of data 316 as pages of I/O device virtual memory 354, similar to the virtual memory view of data processing system 302. I/O bridge logic 336 presents this view to I/O devices 306, 308, and 310. To maintain this view, the entries (not shown in FIG. 3) in TCE table 356 map blocks 314 of data 316 to pages in I/O device virtual memory 354. Accordingly, the I/O devices may refer to data 316 by reference to a page in I/O device virtual memory 354 regardless of the actual location of the data, that is, regardless of which physical pages 318 may be currently storing the data.

I/O bridge 312 provides I/O bridge logic 336 that lies between bus 320 and I/O bus 334. Memory requests on I/O bus 334 come in from I/O devices with virtual addresses to reflect I/O device virtual memory 354. Address translation logic 360 effectively accesses TCE table 356 (which is kept in I/O device virtual page order) to determine the physical page address that it should apply to bus 320 in order to access the correct one of physical pages 318 associated with the memory request from I/O bus 334.

Migration by Means of Multiples Migration Descriptors as Disclosed in U.S. patent application Ser. No. 11/380,052

Figure 4A:
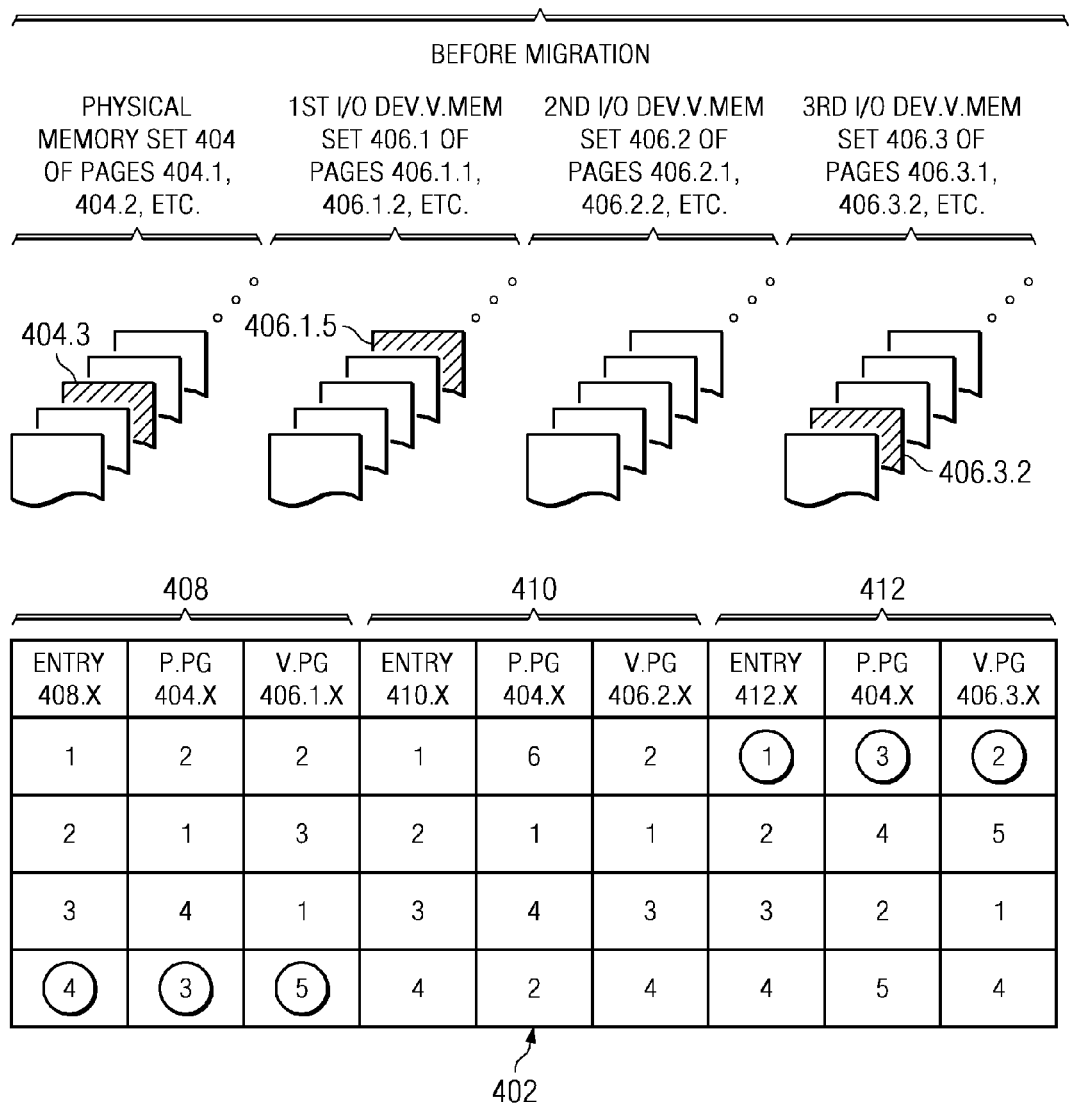
FIG. 4A is a diagram that schematically illustrates an example of migrating data before a migration in accordance with an illustrative embodiment.

FIG. 4A is a diagram that schematically illustrates an example of migrating data by means of multiple migration descriptors. TCE table 402, a number of physical memory pages 404, and I/O device virtual memory pages 406 are shown in more detail to illustrate an example of migrating data from a first one of physical memory pages 404, according to an illustrative embodiment. TCE table 402 may be a TCE table, such as TCE table 356 of FIG. 3, physical memory pages 404 may be physical pages, such as physical pages 318 of FIG. 3, and I/O device virtual memory pages 406 may be pages such as those in I/O device virtual memory 354 of FIG. 3. Specifically, as shown in FIG. 4A, individual ones of physical memory pages 404 may be referred to as 404.1, 404.2, etc.

Data from page 404.3 is targeted for migrating. I/O device virtual memory pages 406 are shown from the viewpoint of respective I/O devices, etc. That is, a first set of I/O device virtual memory pages 406.1 is for a first I/O device, such as disk 306 of FIG. 3, a second set of pages 406.2 is for a second I/O device, such as device 308 of FIG. 3, and a third set 406.3 is shown for a third I/O device, such as I/O device 310 of FIG. 3.

Sections 408, 410, and 412, include specific entries 408.X, 410.X, and 412.X in each section that are shown for TCE table 402. Sections 408, 410, and 412 correspond to respective I/O devices, such as I/O devices 306, 308, and 310 of FIG. 3. In this manner, the section in table 402 in which an entry is located indicates the I/O device which may access the physical page corresponding to that entry. In the example illustrated, the targeted physical page 404.3 is viewed by the first I/O device as I/O device virtual memory page 406.1.5, while it is viewed by the third I/O device as I/O device virtual memory page 406.3.2. Based on the lack of entries in the second section 410 of table 402 for the page 404.3, page copy software, such as page copy software 358 of FIG. 3, determines that the second I/O device has no mapping to page 404.3. That is, page 404.3 is not subject to access by the second I/O device.

Summarizing the above, the page copy software has identified the I/O devices which may access page 404.3 (and those which may not) by finding entries for physical page 404.3 in table 402. Specifically, in this example, the page copy software has determined that first I/O device and the third I/O device may access page 404.3.

In order to permit a direct memory access (DMA) operation, an I/O adapter, such as I/O device 345 of FIG. 3, writes data to or reads data from page 404.3, the illustrative embodiments recognize that direct memory access operations may continue during the time that the processor copies the migration source page to the migration destination page as long as the direct memory access read data are fetched from the source migration page and direct memory access write data are stored in both the migration source page and the migration destination page.

The illustrative embodiments further recognize that when the processor copies the migration source page to the migration destination page, the data in the source page may not be static. Accordingly, the data copy operation must copy an atomic piece of data from the source to the destination and then verify that the data in the source location is still the same.

A migration mode bit is defined in the TCE table. The lower order 12 bits in the TCE table are reserved for control purposes. The migration mode bit inserts a level of indirection in a TCE fetch process. The real address portion of the original TCE points to a 16 byte migration descriptor. The first 8 bytes of the 16 byte migration descriptor provides the real address of the source page in a TCE format, and the second 8 bytes provides the real address of the destination page also in a TCE format.

Turning on the migrate mode bit modifies the processor host bridge (PHB) processing of DMA operations as set forth below:

A. DMA read operation:
1. fetches the TCE and determines that the migration bit is set on;
2. fetches the first 8 bytes of the migration descriptor, which provides only one cycle of indirection;
3. fetches the DMA read data as specified by the source page TCE; and
4. DMA read data is supplied by the source page.

B. DMA write operation:
1. fetches the TCE and determines the migrate bit is set to on;
2. fetches the entire 16 byte migration descriptor;
3. coherently writes the data to the source page, per source TCE, (Note: The cached copies must be invalidated before the next write.); and
4. coherently writes the data to the destination page, per destination TCE, (Note: The cached copies must be invalidated before the next write.).

In order to migrate data from one physical memory location to another physical memory location, the page copy software performs the following functions:

A. sets the migration descriptor, one migration descriptor is needed for each physical block that is uniquely mapped within the migrating block;
B. sets the TCE(s) that map into the migration block to access the appropriate migration descriptor;
C. loops through the source page, for example, loops through the source page per source page word until the source word is the same after the store so as to catch the situation where a DMA write changes the data during copying:
1. loading the source word;
2. storing the word to the target page;
3. reloading the source word for test; and
4. ending the loop; and
D. sets the TCE(s) to the value in the destination page field of the migration descriptor.

Figure 4B:
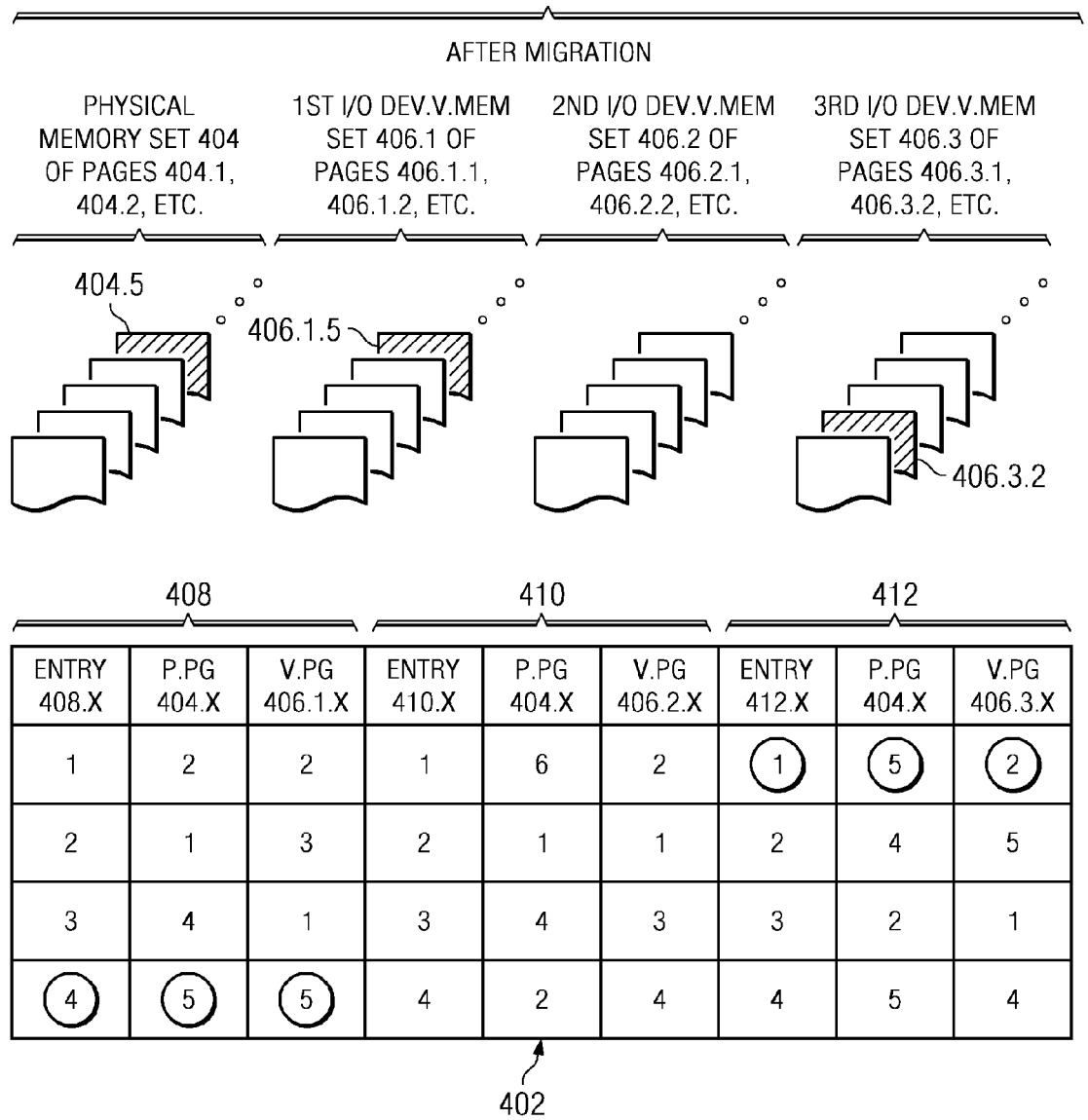
FIG. 4B is a diagram that schematically illustrates an example of migrated data after a migration in accordance with an illustrative embodiment.

Referring now to FIG. 4B, a diagram is depicted that schematically illustrates an example of data migrated by means of multiple migration descriptors. As shown in FIG. 4B, the page copy software moved the data from the first physical page 404.3 to a second physical page 404.5. Once the data is moved, the page copy software updates the set of entries in TCE table 402. As shown, after the update, entry 408.4 references virtual page 406.1.5 to the new physical page 404.5, and the entry 412.1 references virtual page 406.3.2 to the new physical page 404.5.

Figure 5:
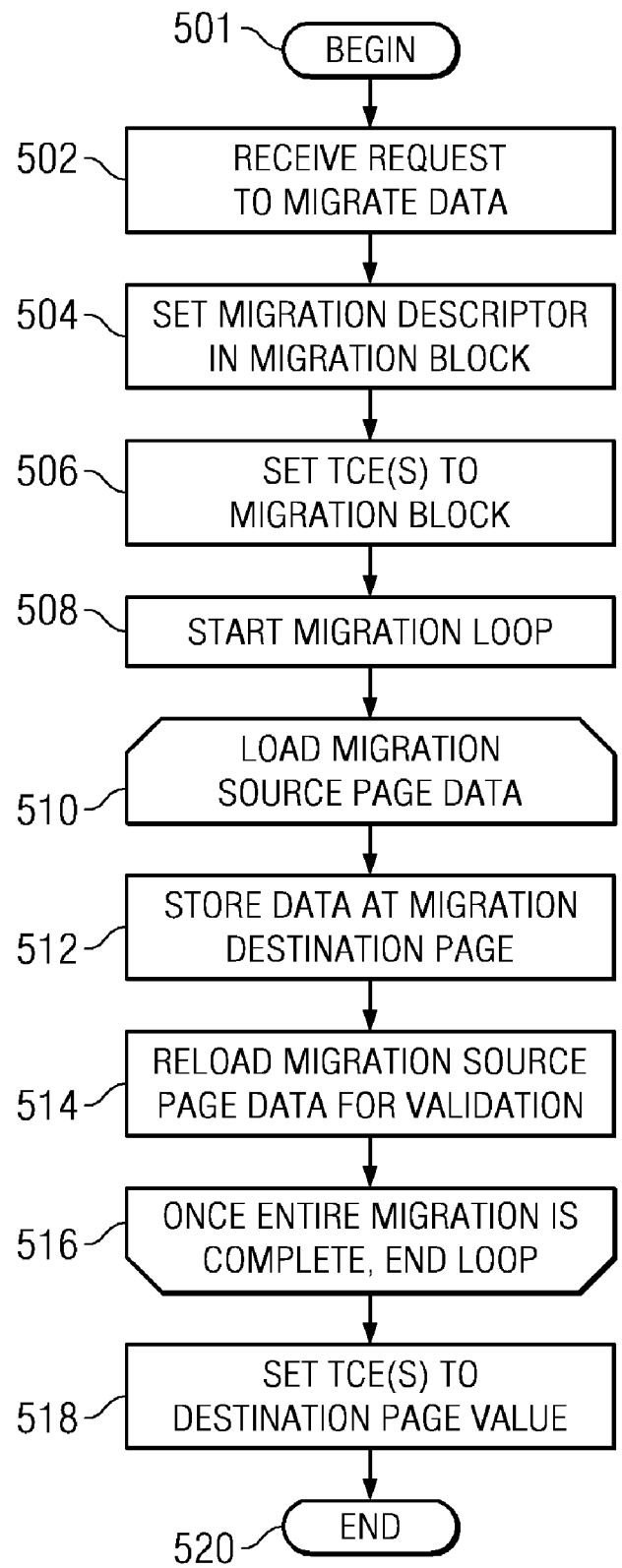
FIG. 5 is a flowchart that illustrates an operation of migrating data that is subject to access by I/O devices by multiple migration descriptors.

FIG. 5 is a flowchart that illustrates an operation of migrating data that is subject to access by I/O devices in accordance with an illustrative embodiment. In these examples the process may be implemented in a component, such as page copy software 358 of FIG. 3. As the operation begins (step 501), a request is received to move data from a physical page "X" to a physical page "Y" (step 502). The page copy software sets a migration descriptor in the translation control entry migration block that references the migration source page and the migration destination page (step 504). A migration descriptor is needed for each physical page that is being migrated. The page copy software then sets the one or more TCE(s) to point to the migration block so that the TCE(s) may access the migration descriptor(s) (step 506). Then, the page copy software starts a loop through the migration source page (step 508).

The page copy software loops through the migration source page n bytes at a time so that the migration store is the same, in order to catch any changes that may be made if a DMA write were to occur during the migration. Thus, the page copy software loads the migration source page data n bytes at a time (step 510), stores the n bytes to the migration destination page (step 512), and reloads the migration source page data to determine the migration is valid (step 514). If the stored destination page is different, the reloaded migration source page data is stored at the destination page and the validation process repeats. Once all the data from the migration source page has been moved to the migration destination page, the loop ends (step 516). Therefore, once the migration starts, any DMA write is made both to the migration source page as well as the migration destination page. However, the looping process ensures the migration source page data is the same as the migration destination page data. Finally, the page copy software sets the TCE(s) in the TCE table to the destination page value specified in the migration descriptor (step 518), with the operation ending (step 520) thereafter.

Enhanced Migration by Means of Only a Single Migration Descriptor for a Plurality of Contiguous Sub-Pages in a Page As described above, when using multiple migration descriptors, the real address portion of the original TCE points to a 16 byte migration descriptor. In the 16 byte migration descriptor, the first 8 bytes provide the real address of the source page in a TCE format, and the second 8 bytes provides the real address of the destination page also in a TCE format. Therefore, a different migration descriptor is required for each page. As will be discussed further below, a page can comprise multiple sub-pages, each with a different real address range. The allocation and management of all the migration descriptors necessary to migrate a large page with a large number of sub-pages introduces a significant overhead into the memory migration process. Computer systems memory management has advanced in that it is recognized that one memory page size does not efficiently cover all usage. Certain data are compactly organized such that a small page, such as 4K bytes, works well. Other data structures are inordinately constrained by such small pages and are accessed more efficiently through larger pages such as 64K or 16 Meg. These multiple page sizes introduce a complexity for memory migration.

Figure 6:
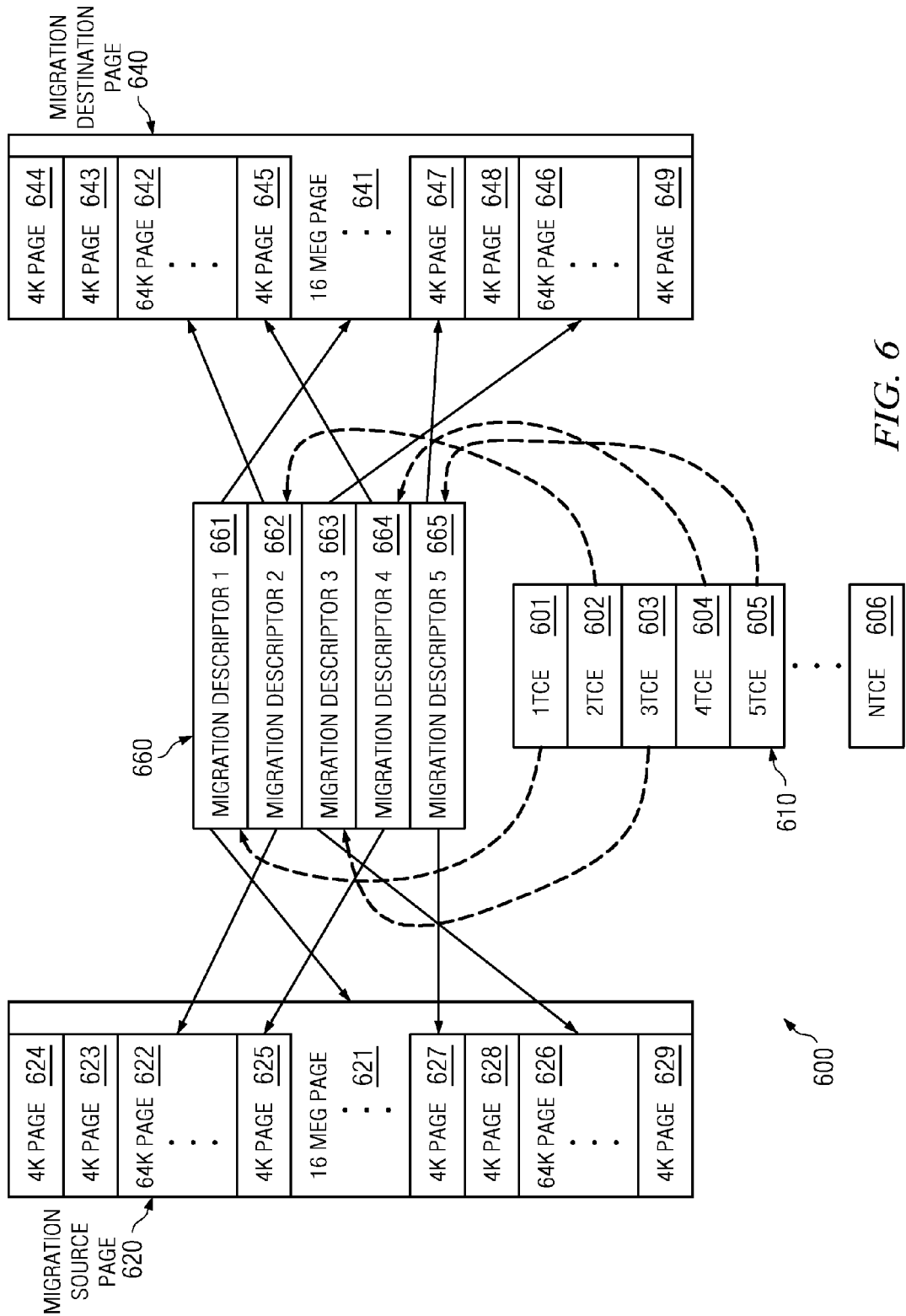
FIG. 6 is migration of a page by means of multiple migration descriptors.

For example, FIG. 6 depicts first migration 600. In first migration 600, migration source page 620 is an exemplary large source page with a size of 16 Meg containing a plurality of contiguous sub-pages mapped with multiple I/O page sizes, such that it requires one 16 Meg migration descriptor, 256 64K migration descriptors, and 4096 4K memory descriptors to perform the migration of the 16 Meg page from one real address range to another. Because the large number of memory blocks described cannot be shown in FIG. 6, only a portion of the blocks and migration descriptors are shown by way of example and as representative of the total number of blocks of data described. Thus, a large page can have a very large number of contiguous sub-pages, each of the contiguous sub-pages having a different real address range.

Referring to FIG. 6, each translation control entry (TCE) in TCE table 610 that maps a unique area of the large page being migrated needs its own migration descriptor. The page copy software, therefore, sets a migration descriptor (see 661 through 665) in the translation control entry migration block (see 601 through 606) that references the migration source page and the migration destination page. Thus, 16 Meg page 621 has migration descriptor 1 661 from first translation control entry (1TCE) 601 that references the 16 Meg page address in migration source page 620 to the destination page 16 Meg page address 641 in the destination page 640. As an example of a sub-page, source 64K page 622 has migration descriptor 2 662 from 2TCE which references source 64K page 622 to destination 64K page 642. Source 64K page 626 has migration descriptor 3 663 from 3TCE 603 which references source 64K page 626 to destination 64K page 646. Source 4K page 625 has migration descriptor 4 664 from 4TCE 604 that references source 4K page 625 to destination 4K page 645. Source 4K page 627 has migration descriptor 5 665 that references source 4K page 627 to destination 4K page 647. Persons skilled in the art are aware that each of the 256 64K pages requires its own migration descriptor and each of the 4,096 4K pages requires its own migration descriptor. TCE Table 610 can have any number of TCE entries depending on the number of pages to be migrated and this is represented by the letter N in NTCE entry 606.

The allocation and management of these multiple migration descriptors, required for each I/O mapped logical page, introduces a significant overhead into the memory migration process. A problem to be solved is, therefore, how to migrate data without the memory load caused by multiple migration descriptors for each sub-page in a large page.

Large pages are located in contiguous real memory. The enhanced migration descriptor relies upon the fact that large pages are located in contiguous real memory. Any sub-mapping of a large page exists at the same relative offset in both the migration and source pages. The sub-mapping of a large page exists at the same relative offset in both the source and destination pages. Therefore, if a system is adapted to the sub-mapping, only a single migration descriptor is necessary for a page of data. Thus, rather than a migration descriptor for each I/O mapped logical page that covers the real address range, all that is needed is an enhanced migration descriptor to indicate by how many high order bits the real address of the migration source and destination pages may differ indicating size and the value of those high order bits for the destination page indicating target location.

Figure 7:
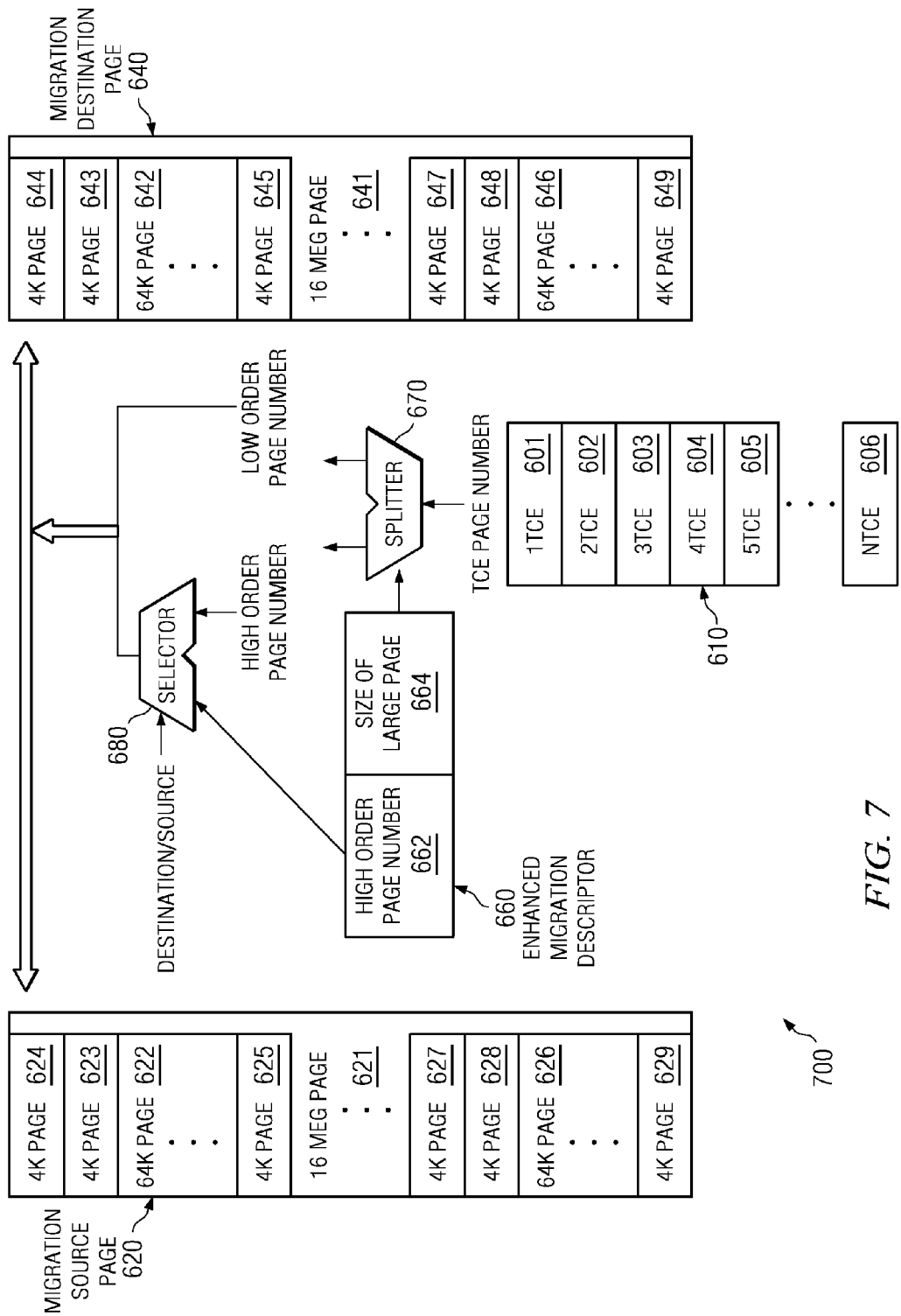
FIG. 7 is migration of a page by means of only a single migration descriptor.

FIG. 7 is a second migration 700. Referring to FIG. 7, a method, apparatus, and program product are shown using only a single migration descriptor for a large page migration. The single migration descriptor greatly simplifies the allocation and management of migration descriptors for the memory migration function and shall be referred to herein an "enhanced migration descriptor." Enhanced migration descriptor 660 is created by page copy software and is used as input to splitter 670 and selector 680. Splitter 670 divides each TCE page number into a high order page number bits and a low order page number bits. The low order page number bits represent the offset of the DMA operation into both the source large page being migrated to the destination large page. The high order page number bits represent the address of the origin of the migration source large page. The enhanced migration descriptor 660 contains the high order page number bits of the address in the destination page 662 and the size of the page 664. The size of the large page 664 specifies the number of bytes to be migrated. Selector 680 selects either the high order page number bits of the migration source page (from splitter 670) or the high order page number bits of the migration destination page 662 (from enhanced migration descriptor 660). The output of selector 680 is concatenated with the low order page number bits from the splitter 670 to generate the full page address for the DMA operation. The plurality of TCE page numbers are represented by first translation control entry 1TCE 601 through N translation control entry NTCE 606. Only one enhanced migration descriptor is now required for all of the plurality of sub-pages in the large page being migrated. Migration Source Page 620 (the large page) is migrated to Migration Destination Page 640 by means of enhanced migration descriptor 660 and selector 680 as follows: Selector 680 uses the large page size 664 of enhanced migration descriptor 660 in conjunction with a plurality of low order bits selected from entries (see 601 though 606) of TCE table 610 by selector 680 to specify the destination address and the offset of each of the contiguous sub-pages.

Each TCE that maps an area of the page being migrated is processed for read and write operations during the migration as follows. When access to the source page is needed, the high order page number bits from the TCE are selected. When access to the migration destination page is needed, the high order page number bits from the Enhanced Migration Descriptor are accessed. The number of page number bits that are considered high order is defined by the "size of the largest page" field in the enhanced migration descriptor. Thus, since the relative offset of all sub-pages within the page being migrated are consistent between the migration source and destination pages, the low order page number bits are the same for both the migration source and destination pages.

Turning on the migrate mode bit modifies the processor host bridge (PHB) processing of DMA operations as follows:
DMA Read Operation:
1. fetches the TCE and determines that the migration bit is set on. Once the determination is made that the migration bit is on, the page address within the TCE points within the migration source page;
2. fetches the enhanced migration descriptor which identifies the origin of the migration destination large page, plus the size of the large page being migrated and, thus, the number of lower order page address bits that are to be taken from the address field of the TCE to identify the required offset to the migration destination page, fetches the source/destination bit which specifies if read data is to be supplied by the migration source page or the migration destination page;
3. fetches the DMA read data from the migration source or destination page as specified by the migration descriptor source/destination bit; when the migration descriptor source/destination bit indicates that the read data is to come from the source page, then page address is as supplied in the TCE; when the migration descriptor source/destination bit indicates the read data is to come from the destination page, the page address is the page origin as supplied by the enhanced migration descriptor plus the offset within the destination page, as specified by the large page size field within the migration descriptor and as supplied by selecting the appropriate bits from the TCE page address field;

DMA Write Operation:
1. fetches the TCE and determines the migrate bit is set to on;
2. fetches the enhanced migration descriptor; and
3. coherently writes the data to the source page, per the page address within the TCE; and
4. coherently writes the data to the destination page, per the high order page address of the migration destination page origin supplied within the enhanced migration descriptor plus the large page offset as specified by the migration descriptor large page field and supplied by the appropriate low order page address bits selected from the TCE page address field.

Figure 8:
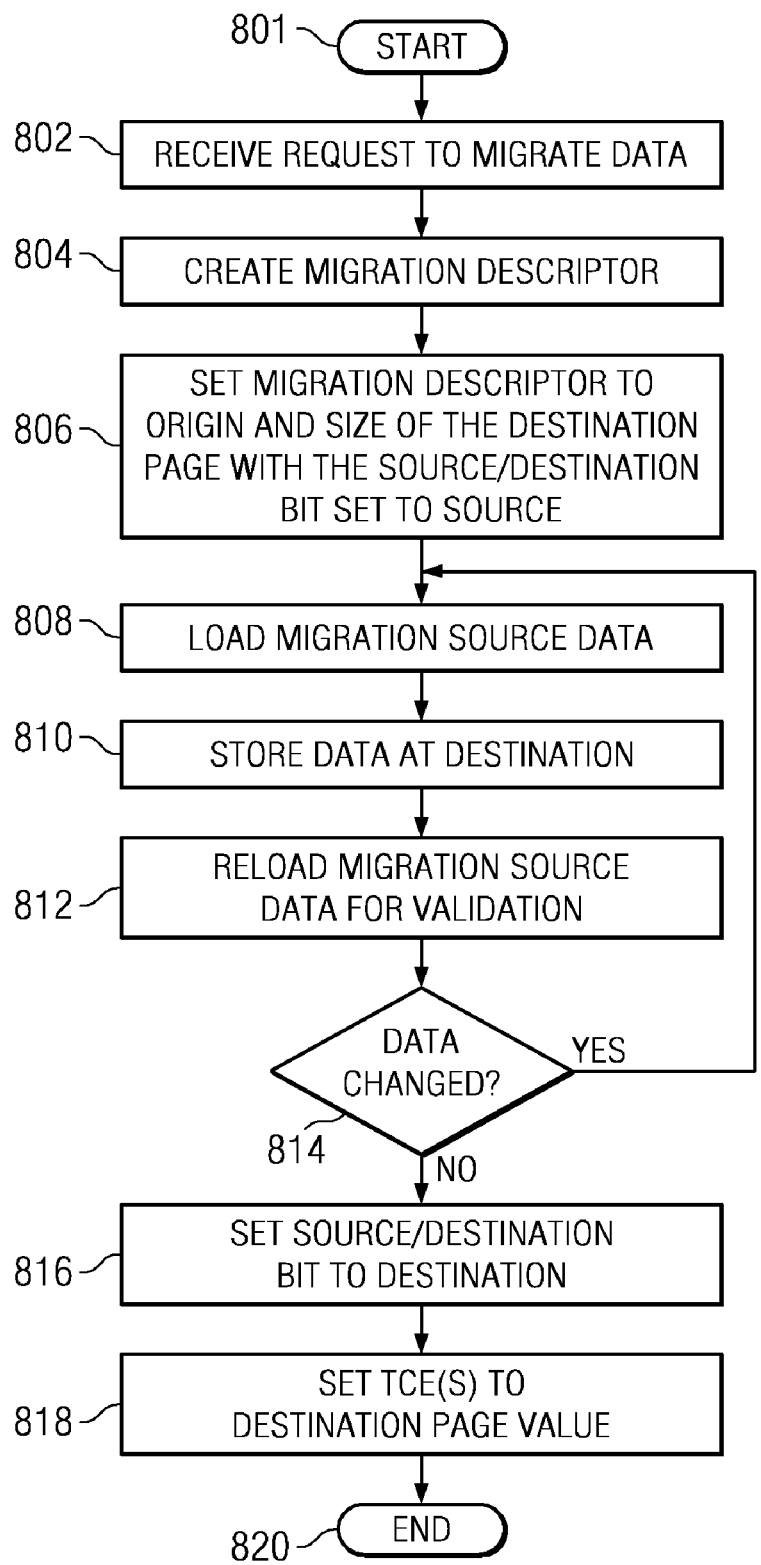
FIG. 8 is a flow chart of the process for employing the single migration descriptor to migrate a page.

FIG. 8 is a flow chart for the process for migrating data by means of a single migration descriptor. In order to migrate data from one physical memory location to another physical memory location, the page copy software starts (801) and receives a request to migrate data (802). An enhanced migration descriptor is created (804). The enhanced migration descriptor is set to the origin and size of the destination page with the source/destination bit set to "source" (806). The migration source data is loaded (808). The migration source data is stored at the destination (810). The migration source data for validation is reloaded (812). A determination is made whether data has changed (814). When data has changed, the process goes to step 808. When data has not changed, source/destination bit is set to destination (816). TCE(s) are set to the destination page value (818). The process stops (820).

Thus, enhanced migration by means of a single migration descriptor, receives a request to migrate data; and responsive to the request, migrate the data from a source page to a destination page. The illustrative embodiments ensure read data for the direct memory access are fetched from the source page and ensure write data for the direct memory access are stored in both the source page and the destination page.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for the purpose of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for migrating a large source page containing a plurality of contiguous source sub-pages accessible by direct memory access devices by means of only a single enhanced migration descriptor, the computer implemented method comprising:
    integrating a splitter and a selector into a configuration of a computer;
    responsive to a request to migrate the large source page containing a plurality of contiguous source sub-pages, dividing, by means of the splitter, a plurality of source translation control entry table addresses for each of the plurality of contiguous source sub-pages into a plurality of high order page numbers and a plurality of low order page numbers;
    identifying, by the selector, the large page and creating an enhanced migration descriptor comprising the high order page number for the large page and a size of the large page; and
    specifying the offset of each of the contiguous sub-pages by a large page size of the enhanced migration descriptor in conjunction with a plurality of lower order bits selected from a translation control entry table by the selector; and
    migrating the large page and each of the plurality of contiguous sub-pages contained in the large page to a destination page.

2. The computer implemented method of claim 1, further comprising:
    during migration of the source page to the destination page, determining whether a direct memory read access is from the source page or the destination page;
    when the direct memory read access is for a first data segment from the source page, obtaining a source location from the translation control entry table to read the data segment; and
    when the direct memory read access is for a second data segment from the destination page, obtaining a destination location derived by the selector from the enhanced migration descriptor and the translation control entry table to read the second data segment.

3. The computer implemented method of claim 1, further comprising:
    during migration of the source page to the destination page, for any direct memory access in both the source page and the destination page, identifying by the enhanced migration descriptor and the selector, the destination address, the size of the large page, and the appropriate offset for the source sub-page for a write data;
    and storing the write data in accordance with the destination address, the size of the large page, and the appropriate offset for the source sub-page.

4. The computer implemented method of claim 1, further comprising:
    responsive to receiving the request to migrate the data, setting the enhanced migration descriptor in a migration block;
    setting the high order page number as an entry to point to the migration block; and
    directing the entry to point to the destination page.

5. The computer implemented method of claim 1, wherein the step of migrating the data from the source page to the destination page further comprises:
    loading the source page data;
    storing the source page data at the destination page;
    reloading the source page data to form reloaded source page data;
    validating the reloaded source page data to the stored destination page data; and
    responsive to the validation concurring, ending the data migration.

6. The computer implemented method of claim 5, further comprising:
    responsive to the validation failing, storing the reloaded source page data at the destination page;
    reloading the source page data to form new reloaded source page data;
    validating the new reloaded source page data to the stored destination page data; and
    responsive to the validation concurring, ending the data migration.

7. A data processing system, comprising:
    a bus system;
    a communications system connected to the bus system;
    a memory connected to the bus system, wherein the memory includes a set of instructions;
    a translation control entry table stored in the memory;
    a selector connected to the bus system;
    a splitter connected to the bus system; and
    a processing unit connected to the bus system, wherein the processing unit executes the set of instructions to perform steps comprising:
        integrating the splitter and the selector into a configuration of the bus system;
        responsive to a request to migrate the large source page containing a plurality of contiguous source sub-pages, dividing, by means of the splitter, a plurality of source translation control entry table addresses for each of the plurality of contiguous source sub-pages into a plurality of high order page numbers and a plurality of low order page numbers;
        identifying, by the selector, the large page and creating an enhanced migration descriptor comprising the high order page number for the large page and a size of the large page; and
        specifying the offset of each of the contiguous sub-pages by a large page size of the enhanced migration descriptor in conjunction with a plurality of lower order bits selected from a translation control entry table by the selector; and migrating the large page and each of the plurality of contiguous sub-pages contained in the large page to a destination page.

8. The data processing system of claim 7, wherein the processing unit executes the set of instructions to perform steps comprising:

during migration of the source page to the destination page, determining whether a direct memory read access is from the source page or the destination page;

when the direct memory read access is for a first data segment from the source page, obtaining a source location from the translation control entry table to read the data segment; and when the direct memory read access is for a second data segment from the destination page, obtaining a destination location derived by the selector from the enhanced migration descriptor and the translation control entry table to read the second data segment.

9. The data processing system of claim 7, further comprising:

during migration of the source page to the destination page, for any direct memory access in both the source page and the destination page, identifying by the enhanced migration descriptor and the selector, the destination address, the size of the large page, and the appropriate offset for the source sub-page for a write data;

and storing the write data in accordance with the destination address, the size of the large page, and the appropriate offset for the source sub-page.

10. The data processing system of claim 7, further comprising:

setting the enhanced migration descriptor in a migration block in response to receiving the request to migrate the plurality of sub-pages;

setting an entry to point to the migration block; and directing the entry to point to the destination page.

11. The data processing system of claim 7, further comprising:

loading the source page data; store the source page data at the destination page; reload the source page data to form reloaded source page data;

validating the reloaded source page data to the stored destination page data; and ending the data migration in response to the validation concurring.

12. The data processing system of claim 11, further comprising:

storing the reloaded source page data at the destination page in response to the validation failing;

reloading the source page data to form a new reloaded source page data;

validating the new reloaded source page data to the stored destination page data; and ending the data migration in response to the validation concurring.

13. A computer program product comprising:

a computer usable medium including computer usable program code for migrating a plurality of source sub-pages in a source page accessible by direct memory access devices by means of only a single enhanced migration descriptor for each destination page, the computer program product including instructions adapted to cause a computer to perform the following steps:

integrating a splitter and a selector into a configuration of a computer;

responsive to a request to migrate the large source page containing a plurality of contiguous source sub-pages, dividing, by means of the splitter, a plurality of source translation control entry table addresses for each of the plurality of contiguous source sub-pages into a plurality of high order page numbers and a plurality of low order page numbers;

identifying, by the selector, the large page and creating an enhanced migration descriptor comprising the high order page number for the large page and a size of the large page; and specifying the offset of each of the contiguous sub-pages by a large page size of the enhanced migration descriptor in conjunction with a plurality of lower order bits selected from a translation control entry table by the selector; and migrating the large page and each of the plurality of contiguous sub-pages contained in the large page to a destination page.

14. The computer program product of claim 13, further comprising:

during migration of the source page to the destination page, determining whether a direct memory read access is from the source page or the destination page;

when the direct memory read access is for a first data segment from the source page, obtaining a source location from the translation control entry table to read the data segment; and when the direct memory read access is for a second data segment from the destination page, obtaining a destination location derived by the selector from the enhanced migration descriptor and the translation control entry table to read the second data segment.

15. The computer program product of claim 13, further comprising:

during migration of the source page to the destination page, for any direct memory access in both the source page and the destination page, identifying by the enhanced migration descriptor and the selector, the destination address, the size of the large page, and the appropriate offset for the source sub-page for a write data;

and storing the write data in accordance with the destination address, the size of the large page, and the appropriate offset for the source sub-page.

16. The computer program product of claim 13, further comprising:

setting the migration descriptor in a migration block in response to receiving the request to migrate the data;

setting an entry to point to the migration block; and directing the entry to point to the destination page.

17. The computer program product of claim 13, wherein the computer usable program code for migrating the data from the source page to the destination page further comprises:

loading the source page data;

storing the source page data at the destination page;

reloading the source page data to form reloaded source page data;

validating the reloaded source page data to the stored destination page data; and ending the data migration in response to the validation concurring.

18. The computer program product of claim 17, further including:

storing the reloaded source page data at the destination page in response to the validation failing;

reloading the source page data to form new reloaded source page data;
validating the new reloaded source page data to the stored destination page data; and
ending the data migration in response to the validation concurring.

* * * * *